3,316,315
CATALYTIC ALKYLATION OF ALKYL-SUBSTI-
TUTED AROMATICS WITH MONOOLEFINS
William A. Jones, Bartlesville, Okla., assignor to Phillips
Petroleum Company, a corporation of Delaware
No Drawing. Filed Jan. 2, 1964, Ser. No. 335,412
4 Claims. (Cl. 260—668)

This invention relates to an improved process for the catalytic alkylation of alkyl-substituted aromatics with monoolefins. In another aspect, it relates to an improved process for the preparation of isobutylbenzene by the potassium-catalyzed alkylation of toluene with propylene.

The alkylation of alkyl-substituted aromatics with monoolefins has been the subject of a number of investigations and patents. Although different catalyst systems have been proposed for this process, an alkali metal catalyst system has been of particular interest in the art since it results in alkylation of the alkyl side chain. Disadvantages encountered in the use of such alkali metal catalyst system, however, are the low production rate, conversion, selectivity and yield of desired alkylated product.

Accordingly, an object of this invention is to provide an improved process for the catalytic alkylation of alkyl-substituted aromatics with monoolefins. Another object is to provide an improved process for the preparation of isobutylbenzene by alkylation of toluene with propylene, using a novel catalyst system. Another object of this invention is to provide a novel composition, suitable as a catalyst in the alkylation of alkyl-substituted aromatics with monoolefins. Another object is to improve the production rate, conversion, selectivity and yield of desired alkylated product in the catalytic alkylation of an alkyl-substituted aromatic with a monoolefin. Other objects and advantages of this invention will become apparent to those skilled in the art from the following description and accompanying claims.

Briefly, the present invention comprises a process wherein an alkyl-substituted aromatic is alkylated with a monoolefin in the presence of a catalyst comprising (1) a major amount of an alkali metal selected from the group consisting of sodium and/or potassium, and (2) a minor amount of graphite. This improved process is exemplified by the side chain alkylation of toluene with propylene in the presence of a catalyst consisting of a major amount of potassium and a minor amount of graphite to prepare isobutylbenzene at a high production rate, yield, conversion, and selectivity.

Potassium is the preferred alkali metal in the catalyst system of this invention because of the high production rate and other advantages its use obtains. Graphite is, of course, an allotropic form of carbon having a hexagonal arrangement of crystals in parallel displaced sheets, and as such differs from other forms of carbon, such as activated carbon or charcoal. Both the alkali metal and graphite are used in their particulate or powdered form in this invention, and they can be added to the alkylation reaction system separately or in the form of a mechanical mixture (i.e., in the form of a mixture where they are not chemically combined).

Generally, the alkyl-substituted aromatics which are alkylated in this invention will have an aromatic nucleus, selected from the group consisting of benzene and napthalene, with at least one alkyl hydrocarbon side chain having at least one hydrogen atom bonded to the alpha carbon atom of the alkyl side chain. The alkyl side chain can comprise only one carbon atom, as in the case of the methyl group in toluene, or the side chain can comprise a number of carbon atoms in straight or branched chain relation, such as in the case of the normal butyl radical in normal butylbenzene. The length of the alkyl side chain and the number of alkyl side chains can vary, but generally the total carbon atoms in the sum of the side chains will be in the range of 1 to 20 and the number of such side chains will be in the range of 1 to 4. Representative alkyl-substituted aromatics which can be alkylated according to this invention include toluene, ethylbenzene, n-propylbenzene, isopropylbenzene, n-butylbenzene, sec-butylbenzene, isobutylbenzene, n-decylbenzene, 1,2,3,4-tetra-n-pentylbenzene, n-eicosylbenzene, 1-ethyl-4-n-octadecylnaphthalene, m-xylene, o-xylene, p-xylene, mesitylene, methyl naphthalene, 1,2,4,5-tetramethylbenzene, 1,4-di-n-pentylnaphthalene, and the like, including mixtures thereof. I prefer to alkylate alkylbenzenes, such as toluene. The aromatic nucleus of the alkyl-substituted aromatic can have other substituents which are unreactive under the alkylation conditions, such as methoxy, ethoxy, and the like, but I prefer that the alkyl-substituted aromatic be strictly a hydrocarbon with the alkyl side chains being the only nuclear substituents.

The monoolefins which are employed as alkylating agents according to this invention are preferably acylic monoolefins with 2 to 20 carbon atoms. Representative monoolefins which can be so employed to alkylate any one of the aforementioned alkyl-substituted aromatics include ethylene, propylene, 1-butene, 2-butene, isobutylene, 1-pentene, 2-pentene, 1-hexene, 2-hexene, 3-hexene, 2-decene, 1-heptene, 2-heptene, 2-octene, 4-nonene, 3-methyl-1-butene, 2-methyl-2-butene, 4-methyl-1-pentene, 1-eicosene, 3-n-tetradecene, 5-n-hexadecene, 6-methyl-4-heptadecene, and the like, including mixtures thereof. I prefer to use the lower monoolefins, such as ethylene and propylene, as the alkylating agent.

The operating variables employed in the alkylation process of this invention can vary widely and will be dependent upon the particular alkyl-substituted aromatic and monoolefinic reactants used and their ratios. The process can be operated either batch-wise or in a continuous fashion, with the reactants brought into mutual contact in any order of addition. The reactants can be dried and preheated if desired and introduced separately or as a mixture into the reaction zone provided with suitable agitation means. After the reaction is complete, the reaction mixture can be cooled, gases and vapors vented therefrom, and the reaction mixture filtered to remove catalyst. The liquid reaction product can be fractionally distilled or otherwise separated to obtain the desired alkylated product. Unreacted aromatic and/or monoolefin can be recovered and recycled to the alkylation reaction zone if desired. The catalyst and any metalated compound can be inactivated or decomposed, if desired, by adding a polar compound, for example, an alcohol such as methanol or isopropanol, to the reaction residue.

Generally, the reaction conditions will comprise those of elevated temperatures and superatmospheric pressures. A suitable alkylation temperature will usually be in the range of 100 to 300° C., preferably 150 to 250° C. The action is generally carried out in a pressurized system and the pressure obtained is generally autogenous and is sufficient to maintain substantial quantities of the olefin and alkyl-substituted aromatic in the liquid phase. Such pressure is usually in the range of about 25 to 600 p.s.i.g., preferably 150 to 500 p.s.i.g., though higher pressures, e.g., up to 800 p.s.i.g., may be obtained, depending upon the reactants chosen and how they are charged and the desired reaction temperature. The reaction period can also vary widely and will be that sufficient to produce a desired yield of alkylated product, but generally the reaction period will range from 1 hour to as much as 50 hours, or even longer, depending upon whether the reaction is carried out batch-wise or in a continuous fashion, and upon other factors such as the relative amounts of reactants used. Because of the high production rates obtained with the use of the novel catalyst system, the reaction period will be shorter than that found necessary heretofore to obtain high yields and high conversions.

The molar ratio of alkyl-substituted aromatic to monoolefin can vary widely, but generally will be in the range of 0.05 to 20 and usually will be in the range between .2 to 2. An excess over the stoichiometric amount of the monoolefin can be used, but most cases it will be preferable to operate with a stoichiometric deficiency of monoolefin. The amount of catalyst used can also vary and stated functionally will be an amount sufficient to catalyze the desired side chain alkylation. The amount of alkali metal used will generally be a major amount (i.e., greater than 50 weight percent) of the catalyst and usually will be from 0.01 to 1.0 gram atoms per mole of the charged alkyl-substituted aromatic reactant. Generally, the amount of graphite used, in combination with the alkali metal, will be a minor amount (i.e., less than 50 weight percent) of the catalyst, this amount being usually from 0.5 to 20 grams per gram atom of alkali metal present in the alkylation zone, preferably from 1 to 10 grams per gram atom of alkali metal present.

The process of this invention can be carried out with any suitable equipment, such as a glass-lined or steel autoclave or tubular reactor, with provision made for stirring the reactants. In commercial operation, it may be desirable to carry out the alkylation in a continuous manner, for example, by passing the reactants over or through a fixed bed of the catalyst, the latter being supported on a carrier such as silica, alumina, etc., if desired. In charging the reactants and in carrying out the reaction, care should be exercised to exclude air or oxygen-containing gas and moisture, and this can be accomplished by purging the reactor with dry nitrogen or other dry inert gas prior to charging it with the reactants and catalyst and by pressuring the reactants and catalyst into the reaction vessel with such gas.

In one aspect of this invention, the toluene and alkali metal are charged first to the reactor, with or without the added graphite, and the mixture heated to 100 to 250° C. for 10 minutes to 24 hours. The resulting mixture of alkylaromatic and alkali metal (together with the graphite if the graphite has not already been mixed with the alkylaromatic and alkali metal) can be mixed in the same or a separate zone with the monoolefin for purposes of side chain alkylation. In the event that the reactants and catalyst are all charged to the reactor at one time, it may be necessary to allow a certain induction period before suitable alkylation rates are obtained. It is also within the scope of this invention to charge the catalyst components separately or in admixture after the reactants have been charged.

The alkyl-substituted aromatic, when used in excess with respect to the monoolefin, functions also as a diluent. However, extraneous diluents such as liquid paraffins, cycloparaffins and aromatics can be employed using, for example, 10 to 200 volume percent of diluent, based on the volume of the alkyl-substituted aromatic. The extraneous diluent used should be inert under the alkylation conditions employed and boil outside the range of the alkyl-substituted aromatic or the desired alkylation products, so that it may be readily separated by the fractional distillation of the alkylation reaction mixture. Suitable diluents which may be used include n-pentane, n-hexane, isooctane, cyclohexane, naphthalene, decahydronaphthalene, white oils, etc.

In general, it will not be necessary to employ conventional promoting agents (often used in the alkali metal-catalyzed alkylation of alkylaromatics with monoolefins) with the alkali metal-graphite catalyst system of this invention in order to obtain high production rates of the desired alkylated product, though such promoters can be used if desired, for example to carry out the reaction at lower temperatures.

The subject invention finds particular applicability in the alkylation of toluene with propylene to prepare isobutylbenzene. In particular I have found that the latter can be prepared with production rates as high as 8.5 grams per hour per gram of potassium and in yields as high as 80 grams per gram of potassium. Furthermore, I have further found that the isobutylbenzene is formed at a very high selectivity and is easily separated by fractional distillation from the alkylation product to produce an isobutylbenzene product of 98 percent or higher purity.

Further objects and advantages of this invention are illustrated in the following examples, but it should be understood that the various materials employed, conditions of operation, and other details recited in these examples should not be construed to unduly limit this invention.

Isobutylbenzene was prepared in a run (Run 1) according to this invention by charging (in a nitrogen atmosphere) toluene and catalytic amounts of particulate potassium and flake graphite to a 2-liter autoclave fitted with a magnetically-driven 1200-r.p.m. turbine impeller. The graphite used had been dried at about 175° C. at 1 mm. for about 2 hrs. The charged materials were heated together at 175° C. for 2 hrs., after which sufficient propylene was charged to maintain a reactor pressure of about 450 p.s.i.g. During and after completion of the ensuing alkylation, samples of the reaction mixture were periodically withdrawn and analyzed by gas-liquid chromatography for purposes of determining production rate, conversion and selectivity.

For purposes of comparison, a similar run (Run 2) was made except that no graphite was added to the reaction mixture.

The amounts of materials used and reaction conditions for these two runs are set forth in Table I, and the results for these two runs are set forth in Table II.

TABLE I

| Run | Initial charge, g. | | | | Reaction conditions | | |
|---|---|---|---|---|---|---|---|
| | Toluene | Propylene | Potassium | Graphite | Temp., ° C. | Pres., p.s.i.g. | Length of run,* hr. |
| 1 | 675 | 293 | 7.3 | 1 | 175 | 430–457 | 9 |
| 2 | 675 | 234 | 7.3 | 0 | 175 | 433–505 | 9 |

*Measured from time of initial addition of propylene to reactor.

TABLE II

| Run | Time after addition of propylene, hr. | Results | | | | | |
|---|---|---|---|---|---|---|---|
| | | Conversion of toluene to isobutylbenzene, percent | Amt.* of isobutylbenzene produced, g. | Toluene selectivities, percent | | | |
| | | | | Isobutylbenzene | n-Butylbenzene | 2-methylindane | High boilers |
| 1 | 1.0 | 19.9 | 195.8 | 86.8 | 9.3 | 2.9 | 0.9 |
| | 2.0 | 39.5 | 388.6 | 88.9 | 7.3 | 1.5 | 2.2 |
| | 3.0 | 45.2 | 444.7 | 85.0 | 8.9 | 2.9 | 3.3 |
| | 4.8 | 55.1 | 542.1 | 85.0 | 7.9 | 2.9 | 4.2 |
| | 7.0 | 59.2 | 582.4 | 84.3 | 7.7 | 3.1 | 5.0 |
| | 9.0 | 62.5 | 614.9 | 84.2 | 7.4 | 2.9 | 5.0 |
| 2 | 0.5 | 4.27 | 42.0 | 81.3 | 3.8 | 14.9 | 0 |
| | 1.0 | 7.27 | 71.5 | 76.8 | 3.8 | 17.9 | 1.5 |
| | 2.0 | 12.1 | 119.0 | 74.9 | 3.6 | 18.7 | 2.8 |
| | 3.0 | 14.4 | 141.7 | 75.6 | 3.5 | 18.3 | 2.6 |
| | 4.0 | 14.9 | 146.6 | 75.1 | 3.5 | 18.4 | 3.0 |
| | 5.0 | 16.3 | 160.4 | 75.0 | 3.8 | 18.3 | 3.0 |
| | 7.1 | 19.0 | 186.9 | 75.9 | 3.4 | 17.5 | 3.2 |
| | 9.0 | 20.5 | 201.7 | 75.0 | 3.6 | 17.2 | 4.1 |

*Cumulative.

Examination of the data in the above tables shows that the use of catalyst system of this invention (i.e., potassium-graphite, Run 1) in the alkylation of toluene with propylene gave significantly higher conversion, yield, and selectivity with regard to the desired isobutylbenzene product. Further, the isobutylbenzene production rates and amount of isobutylbenzene produced per gram of potassium are also significantly greater with the potassium-graphite catalyst system of this invention. For example, at the end of 1 hour and at the end of 9 hours the catalyst system of this invention gave about 3 times as much isobutylbenzene as that obtained with the graphite-free catalyst system.

In another run carried out in the same manner as Run 1, except that 3.6 g. of potassium and 9 g. of graphite were used, a 4-hr. reaction period at 460–506 p.s.i.g. and 175° C. gave an isobutylbenzene production rate for this period of only 1 g./hr., a total yield of only 4 g. of isobutylbenzene per gram of potassium, and a toluene to isobutylbenzene conversion of only 1.7%, indicating that to obtain the advantages of this invention the alkali metal used must make up a major amount of the catalyst.

Various modifications and alterations of this invention will become apparent to those skilled in the art from the foregoing disclosure and example, and it should be understood that this invention is not to be limited unduly to the preferred embodiments set forth herein.

I claim:

1. A process which comprises contacting an alkyl-substituted aromatic with a monoolefin and with a catalyst consisting essentially of (1) a major amount by weight of an alkali metal selected from the group consisting of potassium and sodium and (2) a minor amount by weight of graphite, and recovering the resulting alkylated product.

2. In a process which comprises contacting and catalytically reacting an alkyl-substituted aromatic having a hydrogen-bearing carbon atom alpha to a nuclear double bond with a monoolefin having 2 to 20 carbon atoms per molecule, and recovering the resulting alkylated product, the improvement comprising contacting said monoolefin and said alkyl-substituted aromatic with a catalyst consisting essentially of (1) a major amount by weight of an alkali metal selected from the group consisting of sodium and potassium, and (2) a minor amount by weight of graphite.

3. The process according to claim 2, wherein said alkali metal is potassium.

4. In a process which comprises contacting and catalytically reacting toluene with propylene, and recovering isobutylbenzene from the resulting alkylation product, the improvement comprising contacting said monoolefin and said alkyl-substituted aromatic with catalytic amounts of a catalyst consisting essentially of (1) a major amount by weight of potassium and (2) a minor amount by weight of graphite.

References Cited by the Examiner

UNITED STATES PATENTS

| 2,748,178 | 5/1956 | Pines et al. | 260—668 |
| 2,995,610 | 8/1961 | Schaap | 260—668 |
| 3,034,206 | 4/1963 | Yeo et al. | 260—683.15 |
| 3,160,670 | 12/1964 | Foster | 260—671 |

DELBERT E. GANTZ, Primary Examiner.

C. R. DAVIS, Assistant Examiner.